A. WAIT.
NEEDLE VALVE.
APPLICATION FILED JAN. 13, 1913.
1,075,798.
Patented Oct. 14, 1913.
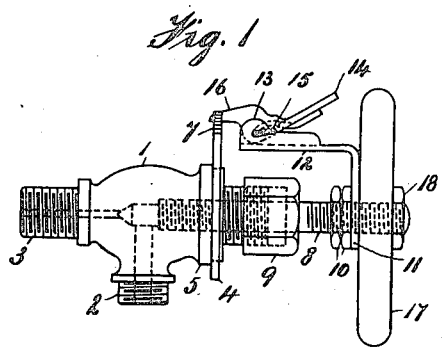
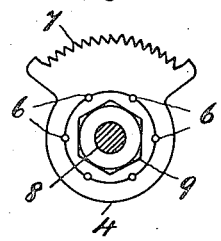
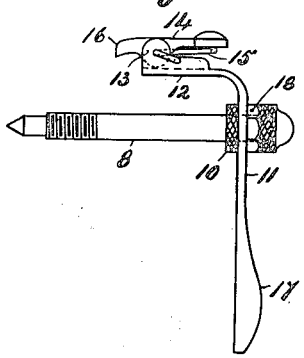
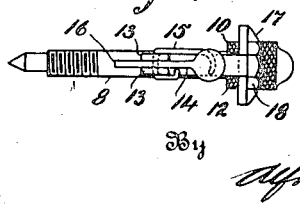
Witnesses
Gertie Nicholson,
J. Allan,
Inventor
Alfred Wait.
By
Alfred F. Bratton.
Attorney

UNITED STATES PATENT OFFICE.

ALFRED WAIT, OF HAMILTON, ONTARIO, CANADA.

NEEDLE-VALVE.

1,075,798.  Specification of Letters Patent.  Patented Oct. 14, 1913.

Application filed January 13, 1913.  Serial No. 741,845.

*To all whom it may concern:*

Be it known that I, ALFRED WAIT, a subject of the King of Great Britain, and a citizen of the Dominion of Canada, residing at Mount Hamilton, in the city of Hamilton, in the county of Wentworth, in the Province of Ontario, Dominion of Canada, have invented certain new and useful Improvements in Needle-Valves, of which the following is a specification.

This invention relates to valves and it has for its main object the provision of means whereby the valve is locked or held in such manner at any desired position so that it cannot be turned on or off by accident, but only with the full knowledge of the person using it and thereby preventing the inadvertent operation of the valve to allow the gas or fluid to escape when not so required.

A further object of my invention is to provide a simple and effective means whereby the locking device can be readily readjusted should the valve become worn or defective.

With these and other objects in view as will be apparent from the following description, my invention consists in the novel features of construction, arrangements and combination of parts hereinafter fully described, illustrated by the accompanying sheet of explanatory drawings forming a part of this specification, and more particularly pointed out in the appended claims.

In the drawings, Figure 1, is a side view of a needle valve embodying one form of my invention. Fig. 2, is an end view of the same, or looking to the left hand of Fig. 1, with the handle removed. Fig. 3, is a detail of a modified form of attaching the hanger and pawl to the valve stem; and, Fig. 4, is a plan of the same.

Similar characters of reference designate the same or similar parts throughout the several views.

The improved needle valve comprises a body portion 1, adapted for fixture to the supply pipe or other convenient part by a threaded projection 2; and 3, is the needle or pin hole service extension.

4, is a collar in engagement with the flange 5, and rigidly locked thereto by center punchings 6, 6; which expand the metal of the flange into correspondingly shaped notches in the collar, and said collar is provided with an arcuate rack 7, disposed substantially at right angles to the valve stem 8. Or said collar 4, may be secured to the flange 5, by an expanding tool adapted to force the metal thereof into appropriate notches. The valve stem 8, is formed in the well known way and is surrounded by a packing nut 9. The outer end of the valve stem 8 is threaded to receive the clamping element or lock nuts 10 which clamp in position an L-shaped hanger comprising the arms 11 and 12, said latter arm lying substantially parallel with the aforesaid stem 8. This arm 12 is fashioned with parallel ears 13, between which is pivoted a pawl 14 carrying a thumb piece lying substantially at right angles to the plane of movement of the pawl, said pawl being under the action of an appropriate spring 15, which also serves as the pivot for the pawl. The pawl 14, is longitudinally extended at 16, to have operative engagement with the aforesaid arcuate rack 7, for the purpose hereafter explained. It is to be particularly noted that the hanger 11, is not threaded on the stem 8, so that ready provision is provided for its adjustment both longitudinally of the said stem 8, and arcuately relative to the rack 7.

17, is the valve handle or turn wheel, and it is threaded on to the aforesaid spindle and kept in adjusted position by a lock nut 18.

It will be readily seen that my invention is equally applicable to any form of needle valve or plug cock.

In the type of my invention shown by Figs. 3, and 4, I form the hanger 11, and handle 17, integral, that is to say from one piece of sheet or cast metal appropriately bent to the desired configuration, and in such cases it will be obvious that the combined hanger and handle will not be threaded on the stem 8, but be loosely mounted thereon in order to make possible ready adjustment of the pawl 14, relative to the arcuate rack 7, when the valve is worn and needs re-setting to prevent leakage.

In use, the needle is screwed up tight and the pawl 14, adjusted to engage in the right hand end of the arcuate rack 7, (Fig. 2) whereupon the parts 10, 17, and 18, are clamped together in rigid engagement. To open the valve the user simply depresses the pawl 14, turns the handle 17, contra-clockwise to the requisite extent and releases the said pawl 14, when the valve is firmly locked at that particular position. To close the valve the handle 17, is reversely or clockwise turned, and it is to be particularly noted that the extreme right and left-hand teeth of the arcuate rack 17, project radially outward farther than the rest of the teeth and thereby limit the movement of the valve as the pawl 14 cannot be forced thereover. In some cases the rack 7, may be formed circumferentially almost entirely around the collar 4, to allow for the further opening of the valve, but it is to be observed that in such cases the pawl extension 16, will be lengthened in order to insure its engagement at all times with the rack 7, between its extreme limits.

Obviously the details of shape and the proportions of the several parts will be entirely dependent upon service conditions, and I wish to point out that I may in some cases form the pawl carrier or hanger 11, integral with the valve plug as will be obvious to those skilled in the art to which my invention appertains. Or, I may form said hanger 11, as a longitudinal projection from the handle 17, in which case the latter will not be threaded on the spindle 8, as above set forth.

From the foregoing description it will be seen that the safety device, while being quite easy to operate, cannot be unlocked by accident, and that the gas or fluid may be turned off and shut off and vice versa.

As all the working parts of the device are plainly seen by the user, one glance is sufficient to show the necessity of placing the finger or thumb on the latch to release it, and how to turn the plug without stopping or turning to examine the rear of the valve.

Having thus described my invention, what I claim as new and desire to secure by Letters Patent, is:—

1. In a device of the character described, the combination with a valve body, of a valve stem rotative therein, lock nuts carried by said valve stem, a manually operable member carried by said valve stem, an L-shaped hanger one arm of which is clamped between said manually operable member and said lock nuts and the other arm of which lies substantially parallel with said stem, a lock nut for locking the manually operable member in clamped engagement with the hanger, an arcuate rack having notched out portions into which the valve body is expanded, said arcuate rack lying substantially parallel with said manually operable member, and a spring actuated pawl pivoted at the free end of the last named arm of the L-shaped hanger and adapted for engagement with said arcuate rack.

2. In a device of the character described, a valve body having a threaded extension, a needle valve stem threaded into said valve body, a packing nut threaded upon said threaded extension to compress packing about said stem, a collar comprising an arcuate rack, the material of the valve body being expanded into notched out portions in said collar, said rack lying substantially at right angles to said stem, a manually operable member mounted upon the outer end of said valve stem and lying substantially parallel with said arcuate rack, a clamping element upon said valve stem, an L-shaped hanger one arm of which is firmly clamped between said manually operable member and said clamping element and the other arm of which lies substantially parallel to said valve stem, parallel ears formed upon the free end of the last named arm, a pawl comprising an end adapted to engage said rack and a thumb piece lying substantially at right angles to the plane of movement of said end, and a pivot member of spring wire serving the double function of pivoting said pawl between said ears and of forcing said pawl into engagement with said rack, one end of said pivot member engaging the rear side of said thumb piece and the other end engaging a portion of said arm.

3. In a device of the character described, a valve body having a threaded extension, a needle-valve stem threaded into said valve body, a packing nut threaded upon said threaded extension to compress packing about said stem, an arcuate rack threaded upon said threaded extension, a manually operable member mounted upon the outer end of said valve stem and lying substantially parallel with said rack, a clamping element upon said valve stem, an L-shaped hanger one arm of which is clamped between said manually operable member and said clamping element and the other arm of which lies substantially parallel to said valve stem, parallel ears formed upon the free end of the last named arm, a pawl comprising an end adapted to engage said rack and a thumb piece lying substantially at right angles to the plane of movement of said end, and a pivot member of spring wire serving the double function of pivoting said pawl between said ears and of forcing said pawl into engagement with said rack, one end of said pivot member engaging the rear side of said thumb piece and the other end engaging a portion of said arm.

Signed at Hamilton, in the county of Wentworth, Province of Ontario, Canada, this 30th day of December, A. D. 1912.

ALFRED WAIT.

In the presence of—
ALFRED T. BRATTON,
GERTIE NICHOLSON.